United States Patent
Yi

(10) Patent No.: US 11,337,192 B2
(45) Date of Patent: May 17, 2022

(54) METHOD AND APPARATUS FOR SUPPORTING MULTIPLE CARRIERS IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/645,743

(22) PCT Filed: Sep. 28, 2018

(86) PCT No.: PCT/KR2018/011556
§ 371 (c)(1),
(2) Date: Mar. 9, 2020

(87) PCT Pub. No.: WO2019/066569
PCT Pub. Date: Apr. 4, 2019

(65) Prior Publication Data
US 2020/0275428 A1     Aug. 27, 2020

Related U.S. Application Data

(60) Provisional application No. 62/565,071, filed on Sep. 28, 2017.

(51) Int. Cl.
| | |
|---|---|
| *H04W 72/04* | (2009.01) |
| *H04L 5/14* | (2006.01) |
| *H04W 74/08* | (2009.01) |
| *H04W 4/70* | (2018.01) |
| *H04L 5/00* | (2006.01) |

(52) U.S. Cl.
CPC ........... *H04W 72/0413* (2013.01); *H04L 5/14* (2013.01); *H04W 74/0833* (2013.01); *H04L 5/0007* (2013.01); *H04W 4/70* (2018.02); *H04W 72/044* (2013.01)

(58) Field of Classification Search
CPC ......... H04W 74/0833; H04W 72/0413; H04W 72/044; H04W 4/70; H04L 5/14; H04L 5/001; H04L 5/1469; H04L 5/0007
See application file for complete search history.

(56) References Cited

U.S. PATENT DOCUMENTS

| | | | |
|---|---|---|---|
| 2012/0155573 A1* | 6/2012 | Pruvost | H04L 27/0014 375/302 |
| 2014/0092784 A1* | 4/2014 | Khayrallah | H04L 1/1887 370/280 |
| 2015/0098412 A1* | 4/2015 | Yerramalli | H04W 74/0808 370/329 |

(Continued)

FOREIGN PATENT DOCUMENTS

WO    WO2017/014560    1/2017

*Primary Examiner* — Brian D Nguyen
(74) *Attorney, Agent, or Firm* — Fish & Richardson P.C.

(57) ABSTRACT

A method and apparatus for communicating with a network in a wireless communication system is provided. A user equipment (UE) receives information on transmission direction of a plurality of time intervals in a first component carrier (CC) and a second CC from the network, and communicates with the network via a virtual carrier, which is either any one of the first CC or the second CC at each of the plurality of time intervals, based on the information. The second CC is shifted in time relative to the first CC by a specific time interval.

17 Claims, 16 Drawing Sheets

(56) References Cited

U.S. PATENT DOCUMENTS

| | | | |
|---|---|---|---|
| 2016/0226650 A1 | 8/2016 | Chen et al. | |
| 2016/0345347 A1 | 11/2016 | Chen et al. | |
| 2017/0238339 A1 | 8/2017 | Lee et al. | |
| 2018/0139036 A1* | 5/2018 | Islam | H04L 5/0048 |
| 2018/0175980 A1* | 6/2018 | Horiuchi | H04L 5/001 |
| 2019/0173658 A1* | 6/2019 | Fehrenbach | H04W 56/001 |
| 2020/0092054 A1* | 3/2020 | Horiuchi | H04W 72/1273 |
| 2020/0296761 A1* | 9/2020 | Liu | H04L 5/1415 |
| 2020/0412510 A1* | 12/2020 | Oizumi | H04L 1/1861 |
| 2021/0219295 A1* | 7/2021 | Webb | H04W 52/143 |
| 2021/0242984 A1* | 8/2021 | Martin | H04W 72/04 |
| 2021/0243760 A1* | 8/2021 | McNamara | H04L 5/0032 |

* cited by examiner

METHOD AND APPARATUS FOR SUPPORTING MULTIPLE CARRIERS IN WIRELESS COMMUNICATION SYSTEM

CROSS-REFERENCE TO RELATED APPLICATIONS

This application is a National Stage application under 35 U.S.C. § 371 of International Application No. PCT/KR2018/011556, filed on Sep. 28, 2018, which claims the benefit of U.S. Provisional Application No. 62/565,071, filed on Sep. 28, 2017. The disclosures of the prior applications are incorporated by reference in their entirety.

TECHNICAL FIELD

The present invention relates to wireless communications, and more particularly, to a method and apparatus for supporting multiple carriers in a time division duplex (TDD) system via carrier aggregation (CA) for ultra-reliable and low latency communications (URLLC) in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

The present invention discusses on multi-carrier based low latency design for time division duplex (TDD) system, particularly utilizing short transmission time interval (TTI) and/or NR.

In an aspect, a method for communicating with a network by a user equipment (UE) in a wireless communication system is provided. The method includes receiving information on transmission direction of a plurality of time intervals in a first component carrier (CC) and a second CC from the network, and communicating with the network via a virtual carrier, which is either any one of the first CC or the second CC at each of the plurality of time intervals, based on the information. The second CC is shifted in time relative to the first CC by a specific time interval.

In another aspect, a user equipment (UE) in a wireless communication system is provided. The UE includes a memory, a transceiver, and a processor, coupled to the memory and the transceiver, that controls the transceiver to receive information on transmission direction of a plurality of time intervals in a first component carrier (CC) and a second CC from a network, and controls the transceiver to communicate with the network via a virtual carrier, which is either any one of the first CC or the second CC at each of the plurality of time intervals, based on the information. The second CC is shifted in time relative to the first CC by a specific time interval.

In another aspect, a method for communicating with a user equipment (UE) by a base station (BS) in a wireless communication system is provided. The method includes transmitting information on transmission direction of a plurality of time intervals in a first component carrier (CC) and a second CC to the UE, and communicating with the UE via a virtual carrier, which is either any one of the first CC or the second CC at each of the plurality of time intervals, based on the second CC is shifted in time relative to the first CC by a specific time interval.

A UE can communicate with a network via only one carrier at each time interval. Therefore, a UE does not need a baseband capability for simultaneous transmission via multiple carriers.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
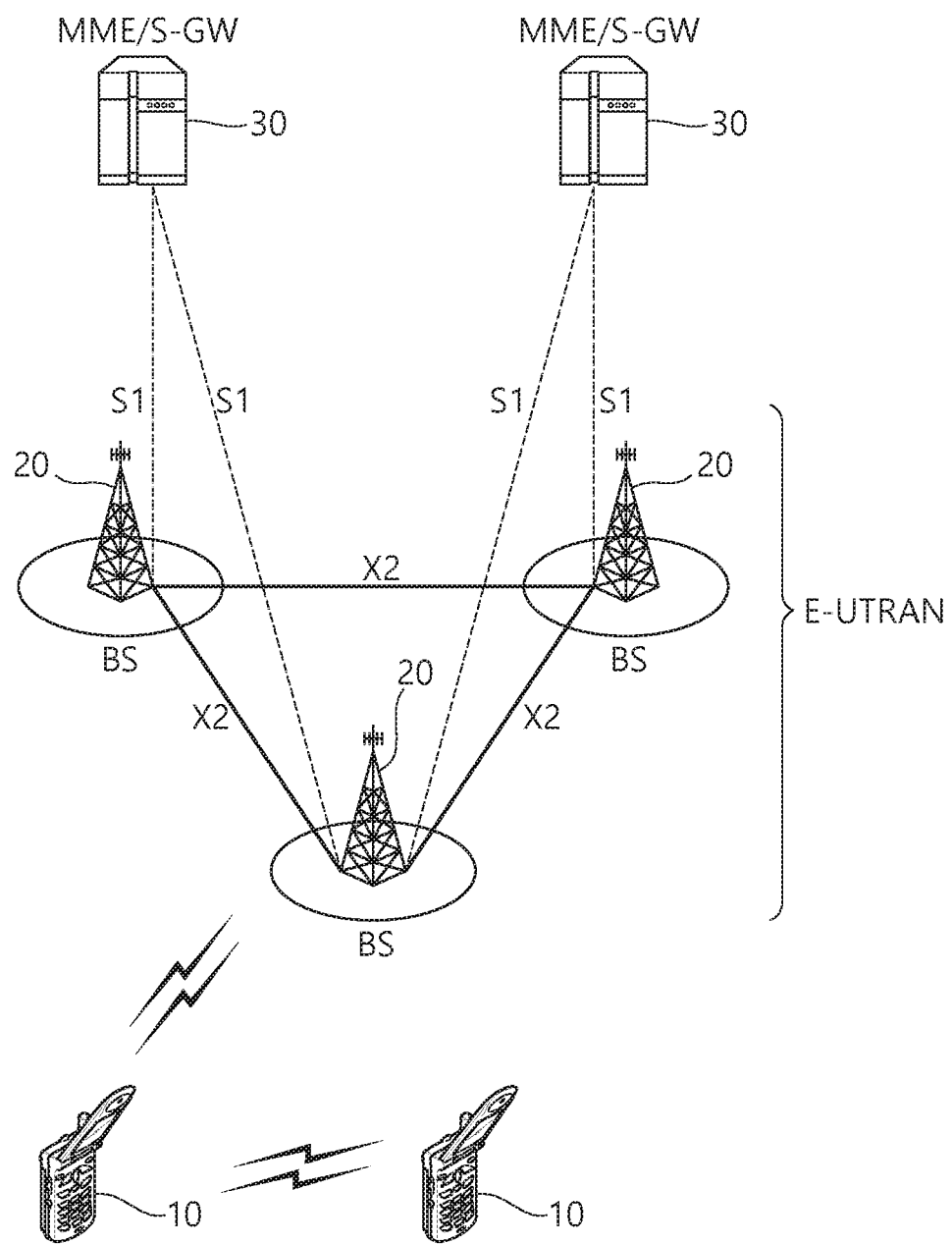
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
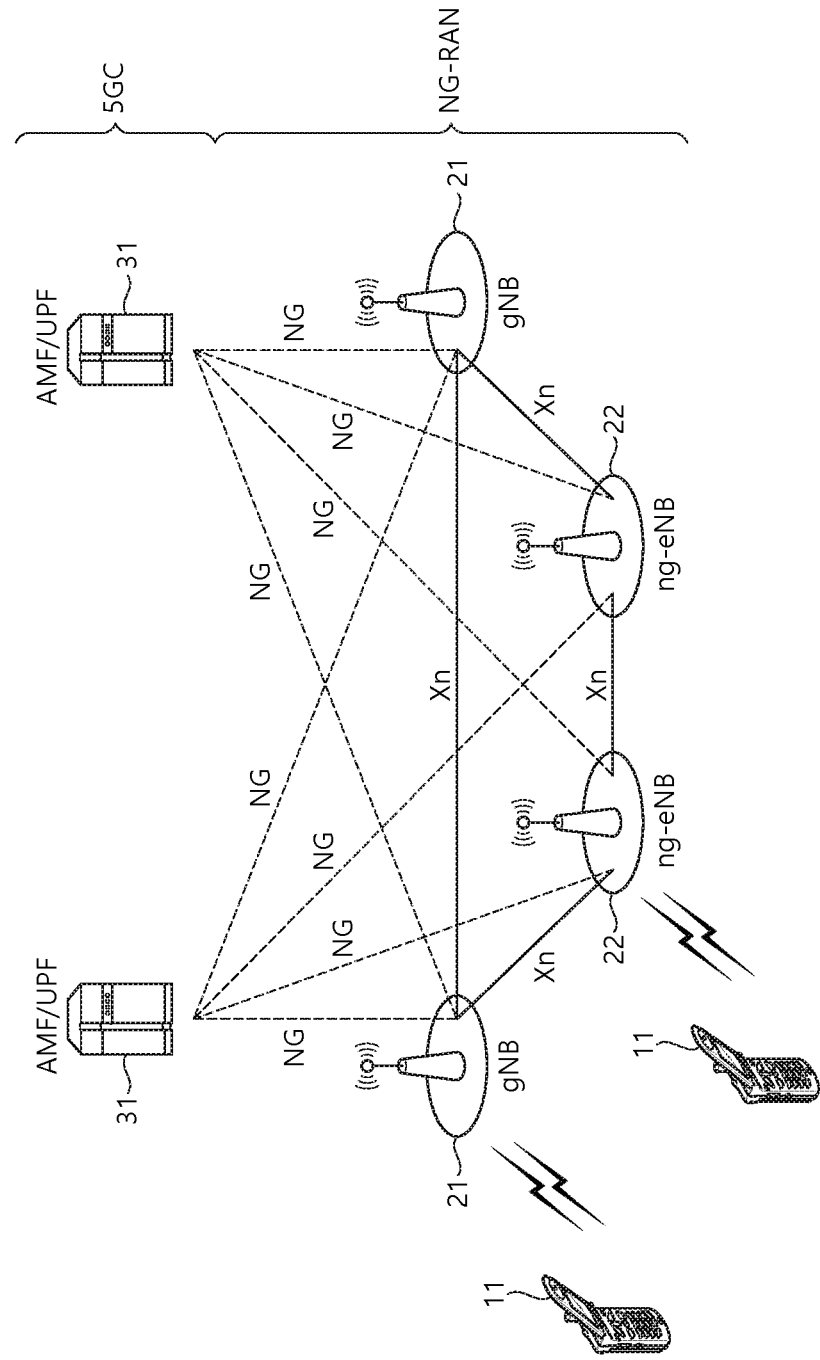
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index μ.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
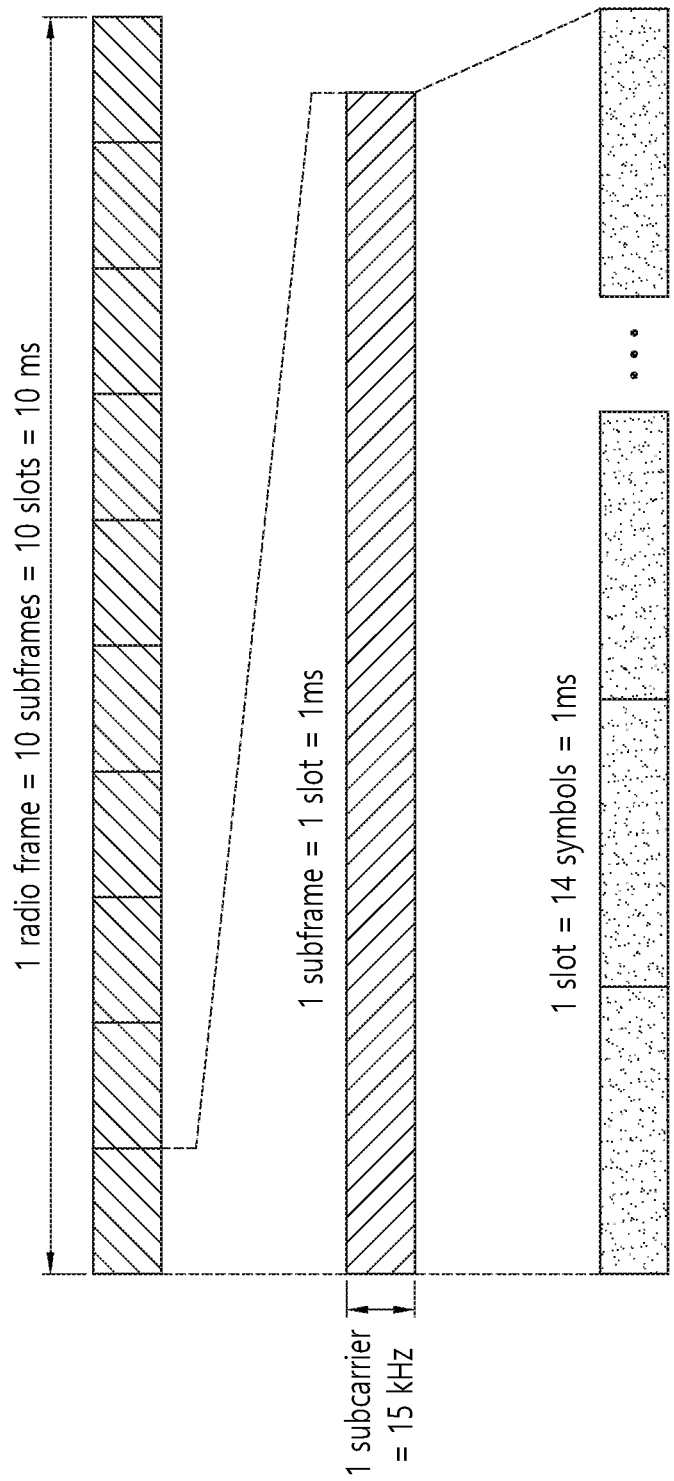
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to μ=0.

Figure 4:
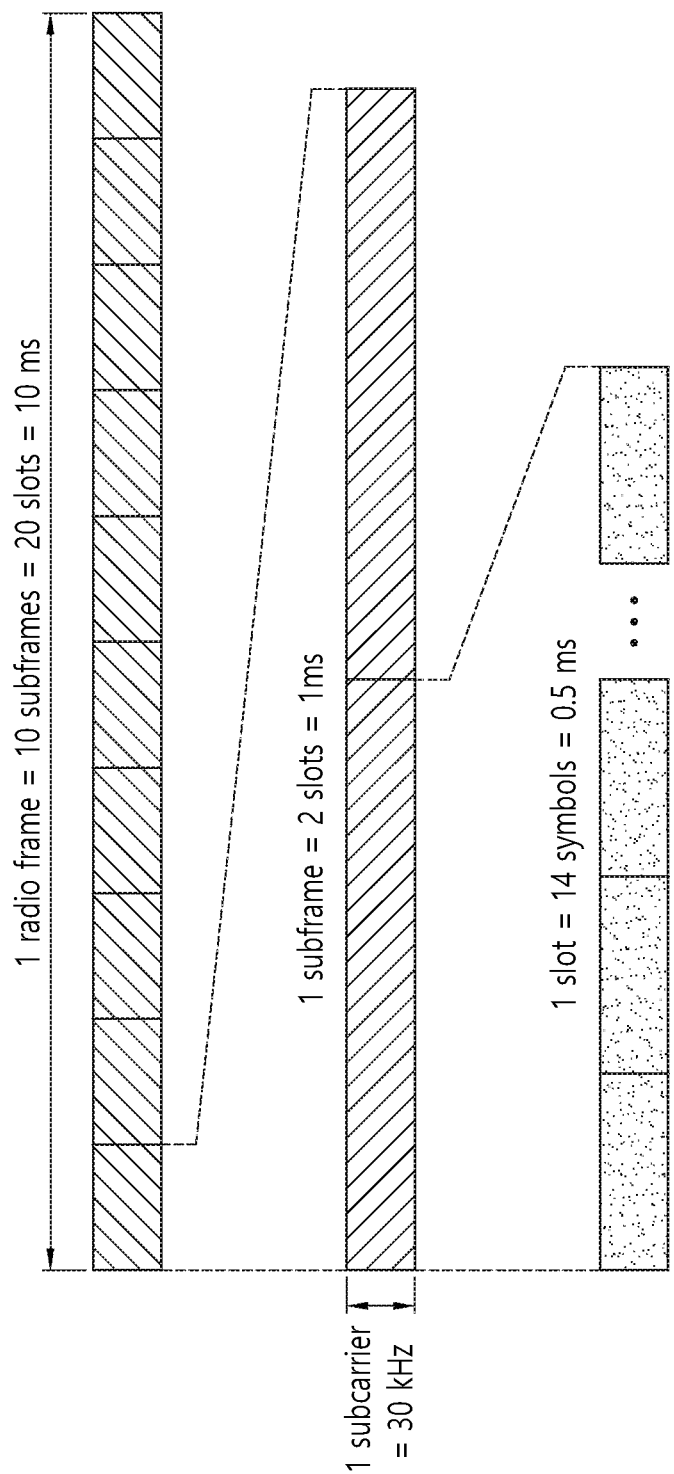
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to μ=1.

Table 3 shows an example of a number of OFDM symbols per slot, slots per radio frame, and slots per subframe for extended CP.

TABLE 3

| μ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| . . . | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
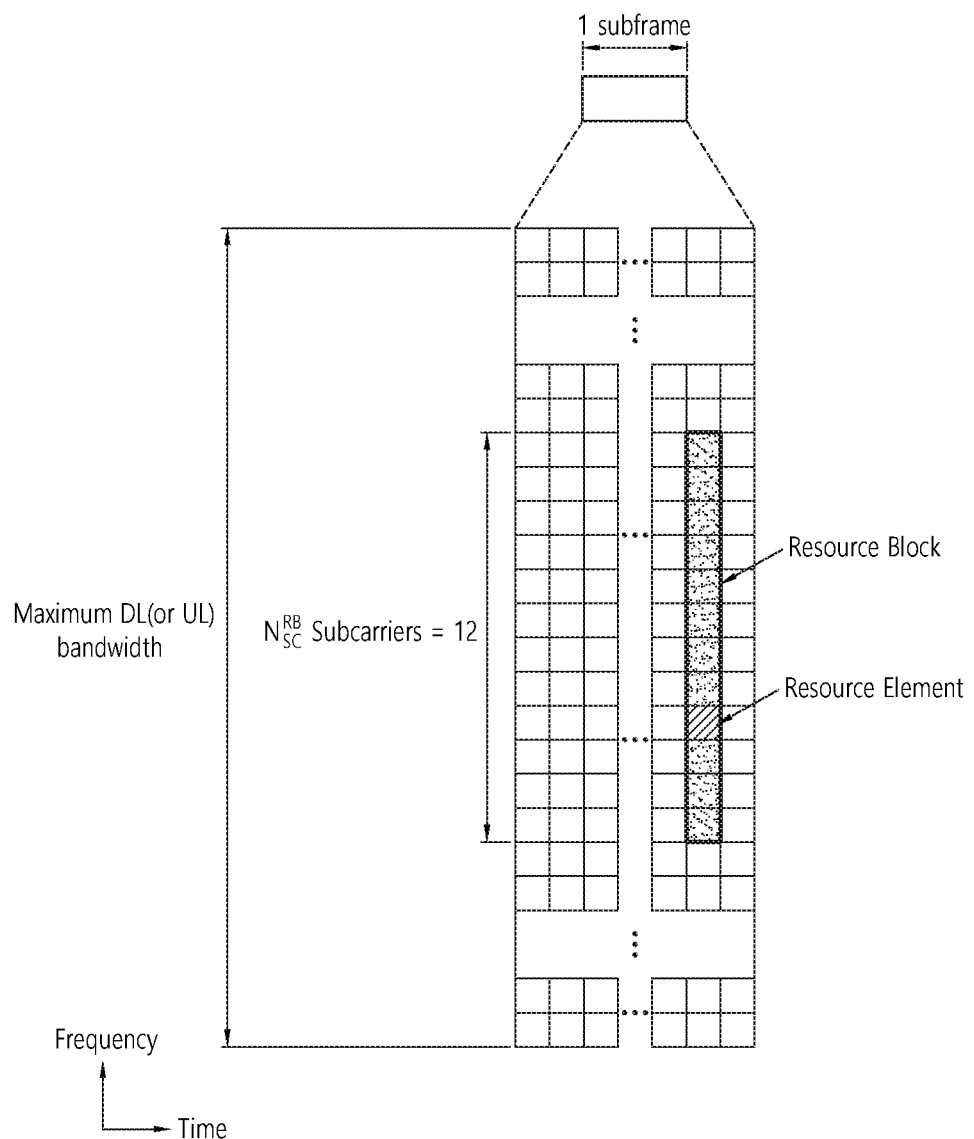
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ," "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
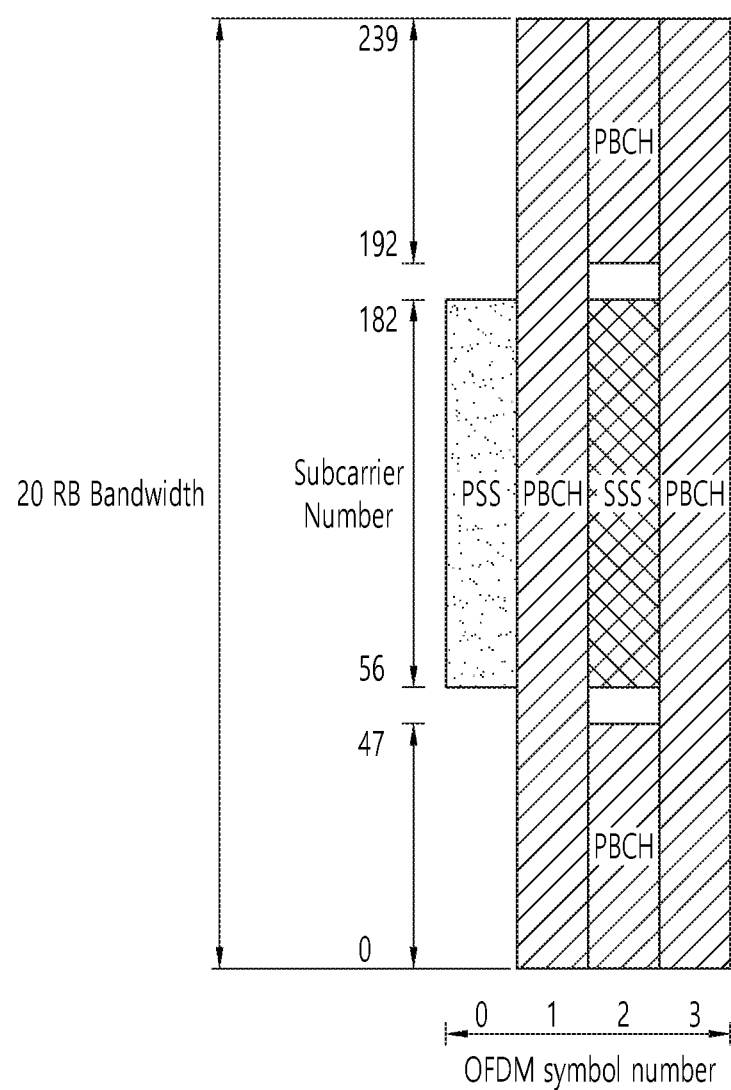
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
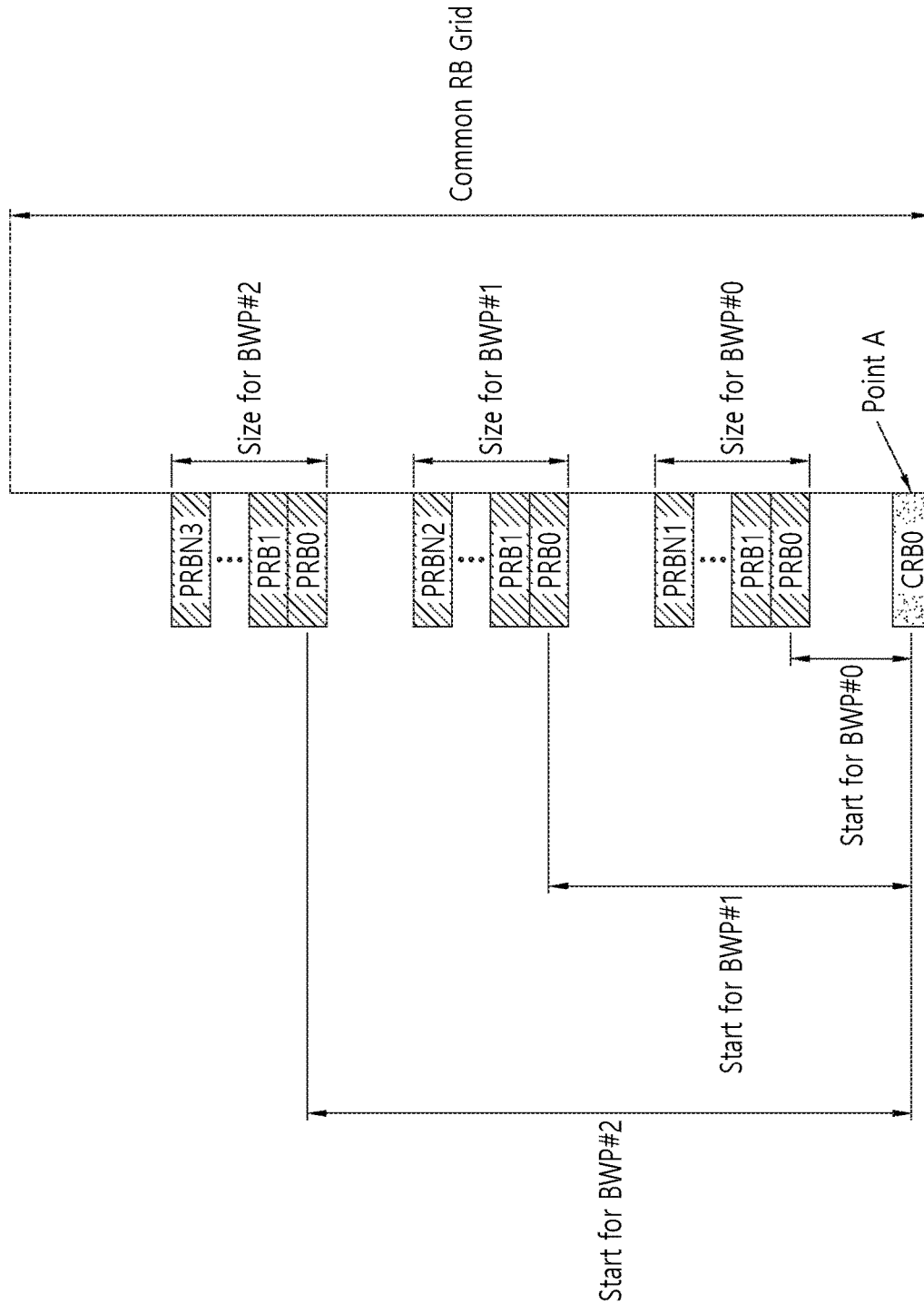
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1).

Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
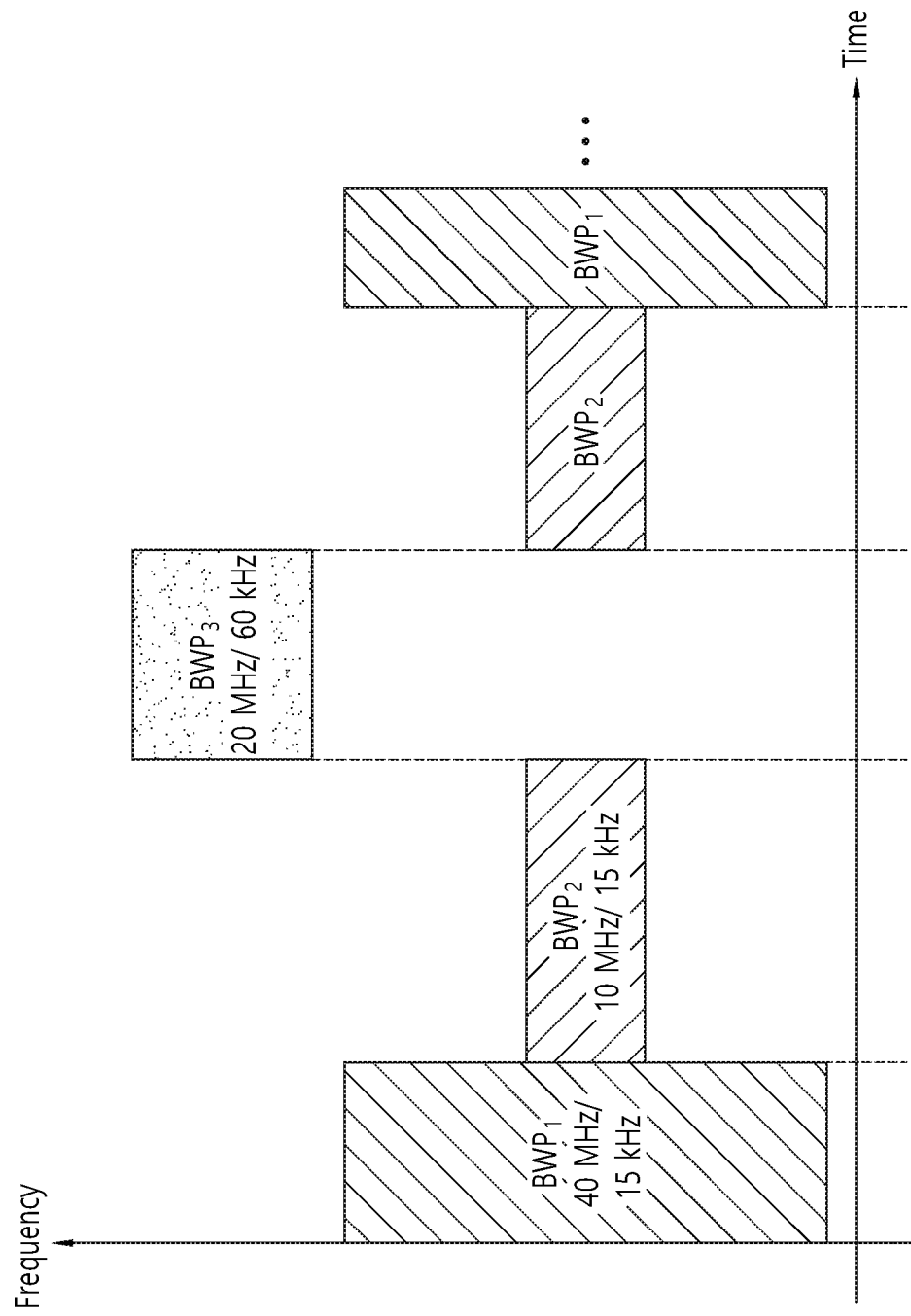
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Table 5 shows a supported UL-DL configurations of TDD frame in LTE/LTE-A. In Table 5, for each subframe in a radio frame, "D" denotes a DL subframe reserved for DL transmissions, "U" denotes a UL subframe reserved for UL transmissions and "S" denotes a special subframe with the three fields downlink pilot time slot (DwPTS), guard period (GP) and uplink pilot time slot (UpPTS).

TABLE 5

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 5-continued

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

UL-DL configurations with both 5 ms and 10 ms DL-to-UL switch-point periodicity are supported. In case of 5 ms DL-to-UL switch-point periodicity, the special subframe exists in both half-frames. In case of 10 ms DL-to-UL switch-point periodicity, the special subframe exists in the first half-frame only. Subframes 0 and 5 and DwPTS are always reserved for DL transmission. UpPTS and the subframe immediately following the special subframe are always reserved for UL transmission.

In case multiple cells with different UL-DL configurations in the current radio frame are aggregated and the UE is not capable of simultaneous reception and transmission in the aggregated cells, the following constraints apply.
 If the subframe in the primary cell (PCell) is a DL subframe, the UE shall not transmit any signal or channel on a secondary cell (SCell) in the same subframe.
 If the subframe in the PCell is a UL subframe, the UE is not expected to receive any DL transmissions on a SCell in the same subframe.
 If the subframe in the PCell is a special subframe and the same subframe in a SCell is a DL subframe, the UE is not expected to receive PDSCH/enhanced PDCCH (EPDCCH)/physical multicast channel (PMCH)/positioning reference signal (PRS) transmissions in the SCell in the same subframe, and the UE is not expected to receive any other signals on the SCell in OFDM symbols that overlaps with the GP or UpPTS in the PCell.

In TDD system, due to time division multiplexing (TDM) between DL and UL, the latency of data transmission may depend on how often DL/UL switching occurs and/or how long the DL/UL switching gap is. Furthermore, unavailable subframes may be considered even in FDD system due to, e.g. multimedia broadcast multicast services (MBMS), sidelink operations, backhaul operations, almost blank subframe (ABS) operations, etc. Therefore, there may be many cases where a set of subframes/slots/resources are not usable, and which will impact on the overall latency. In order to address the above problem, CA framework where DL and UL resources are dynamically used between different carriers may be utilized.

Figure 9:
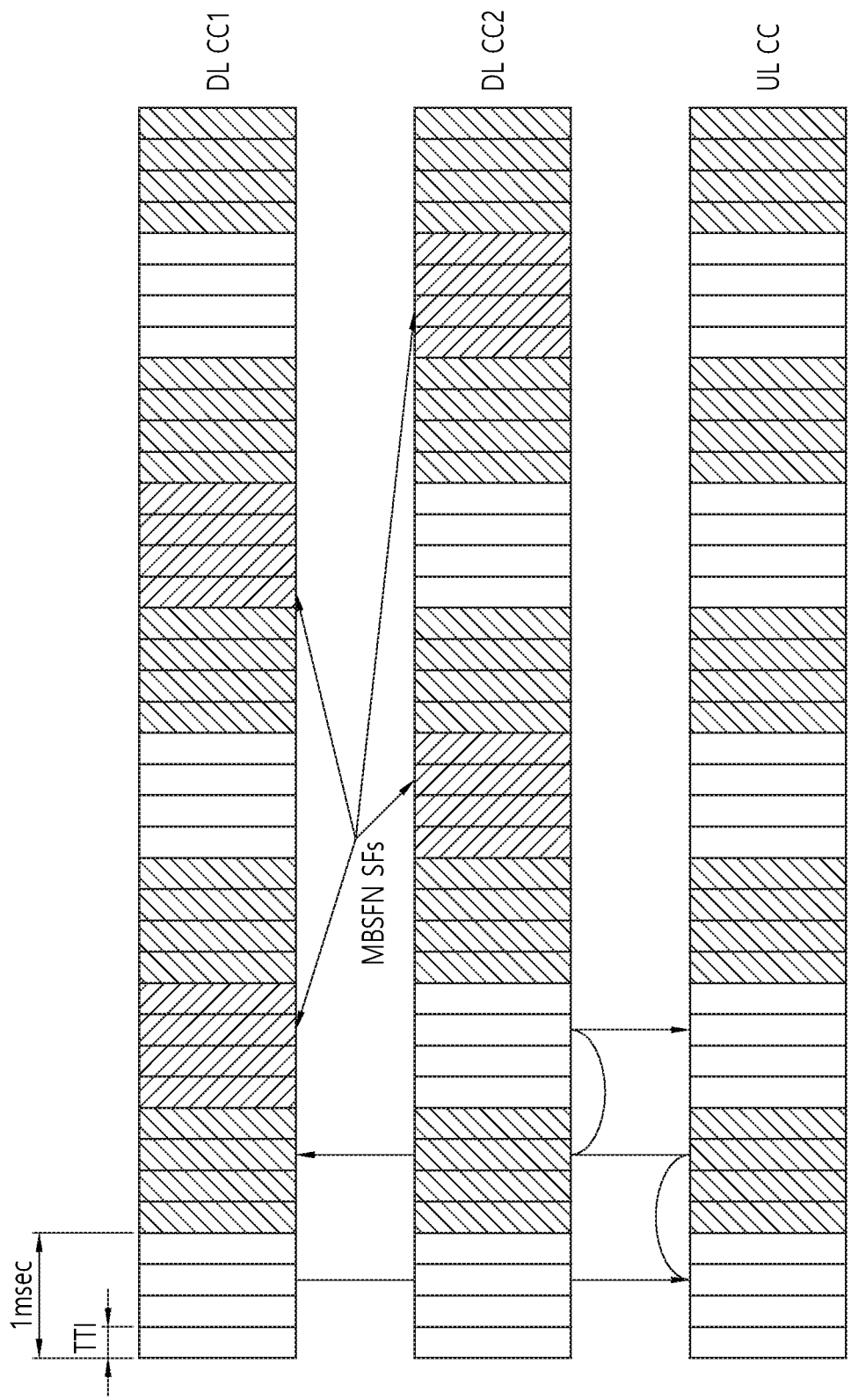
FIG. 9 shows an example of utilizing CA framework and/or dual connectivity (DC) framework to makeup unavailable DL subframes, i.e. MBSFN subframes.

FIG. 9 shows an example of utilizing CA framework and/or dual connectivity (DC) framework to makeup unavailable DL subframes, i.e. MBSFN subframes. Referring to FIG. 9, if the network cannot transmit data to the UE via DL CC1 due to MBMS service (i.e. in MBSFN subframes), the data may be handed-over to DL CC2. For example, physical hybrid automatic repeat request (HARD) indicator channel (PHICH) or DL retransmission may be scheduled via DL CC2, when DL CC1 cannot be utilized.

If DL CC2 is connected via dual connectivity, i.e. DL CC1 is controlled by a first base station and DL CC2 is controlled by a second base station, high-speed backhaul between the first base station and the second base station may be required.

If PHICH is transmitted via DL CC2 rather than DL CC1 and PHICH is transmitted per each short TTI (sTTI), the same resource may be used as if a UE is configured with a virtually one DL carrier, even though two physical DL carriers are used/aggregated for a UE. As there may be other UE(s) configured with different UL carrier (e.g. UL CC2) which will share DL CC2 for PHICH transmission where the same UL resource in different CC may collide in terms of PHICH resource, a UE may be configured with a secondary cell (SCell) index or a cell index which will be used for PHICH and/or scheduling (i.e. carrier indicator field (CIF) value). In other words, a UE configured with a virtual carrier may be configured with a cell index and cross-carrier scheduling principle may be used with the configured cell index to avoid potential resource collision. For example, SCell index larger than the maximum SCell index used for physical carrier aggregation may be used for a virtual carrier aggregation for the sTTI transmission.

The MBSFN subframe between DL CC1 and DL CC2 should not be aligned such that at least one MBSFN subframe among configured/activated CC(s) are available to a UE for the sTTI transmission. This may imply that the subframe index of SCell may not be aligned with the subframe index of primary cell (PCell). For example, if MBSFN configuration between PCell and SCell is identical, a few subframe of SCell may be shifted. In other words, a UE may be configured with carriers which are not aligned in terms of subframe index. In terms of determining when to expect data from DL CC1 or another carrier (on behalf of DL CC1, e.g. DL CC2), semi-static higher layer signaling may be considered. Also, it may be dynamically indicated via DCI. For example, in UL grant, a CC for PHICH transmission corresponding to the UL transmission may be indicated.

Further, techniques mentioned for TDD with multiple carriers may also be applicable for this case including sTTI indexing. In this case, UL carrier for sTTI may be fixed to one FDD UL carrier if all UL subframes are available for sTTI transmission. If only subset of UL subframes are available for some reasons, similar technique to TDD may be used even for FDD case. If TDD subframe and FDD subframe are aggregated, in MB SFN FDD subframe, sTTI DL reception may occur in the aggregated TDD carrier if TDD carrier is DL subframe or is used for DL sTTI.

Similar to MBSFN handling, multiple carriers may be used for handling unavailable DL and/or UL TTI(s).

Figure 10:
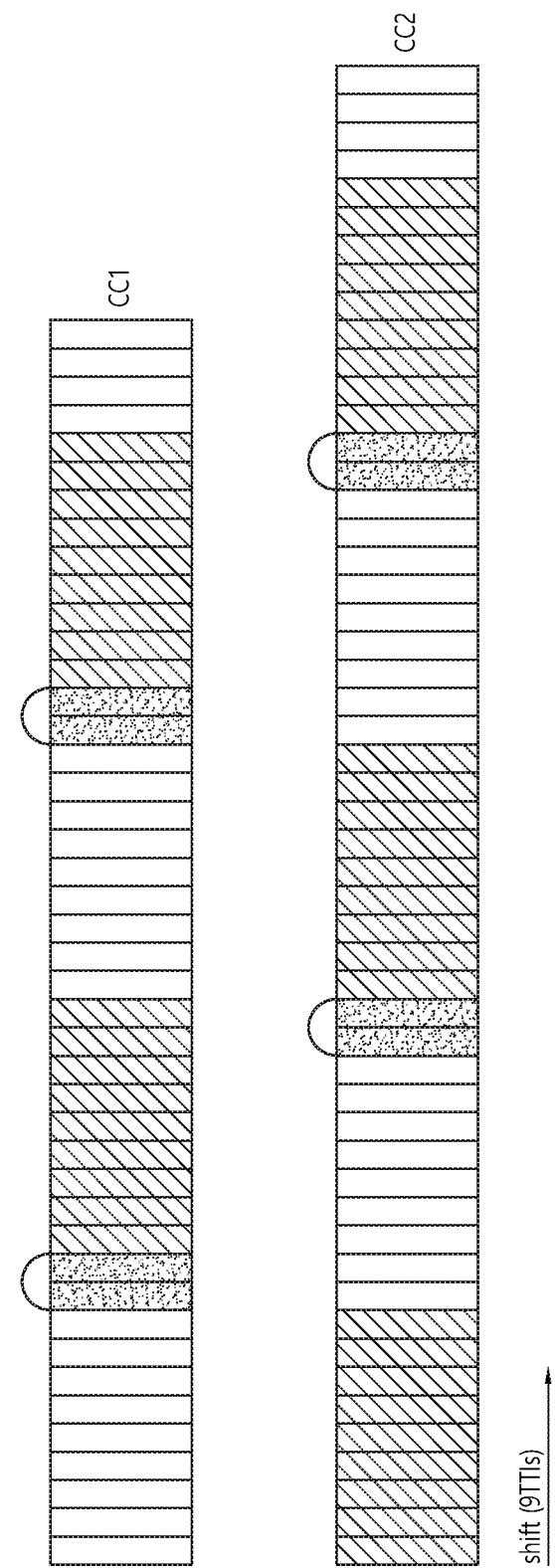
FIG. 10 shows an example of multiple carriers for sTTI in TDD case.

FIG. 10 shows an example of multiple carriers for sTTI in TDD case. This embodiment is based on UL-DL configuration 1. Referring to FIG. 10, a UE is configured with CC1 and CC2, where CC2 is shifted of 9 TTIs (2.25 ms). Thus, CC1 and CC2 may not aligned by subframe index nor subframe boundary. PUSCH may be transmitted at n+4 subframe, in either CC depending on the availability of UL. PHICH may be transmitted at n+6 subframe, where maximum 8 HARQ processes may be mapped per CC. Or, a new HARQ-ACK timing may be considered to maximize the use of all sTTIs.

To support this approach, different timing may be used per frequency. For example, frequency 1 and frequency 2 may be used in a pair to support sTTI operation, in terms of subframe index/boundary. In this case, one carrier may be shifted with a certain value such that the number of available short DL/UL TTI over duration can be maximized. In terms of carrier aggregation, a UE may be configured with a virtual one carrier which is similar to a FDD carrier. For timing advance, a UE may apply timing advance configured per each carrier depending on which carrier is used for UL transmission. For DL, time/frequency may synchronized based on synchronization/CRS/tracking RS transmitted per each carrier.

Figure 11:
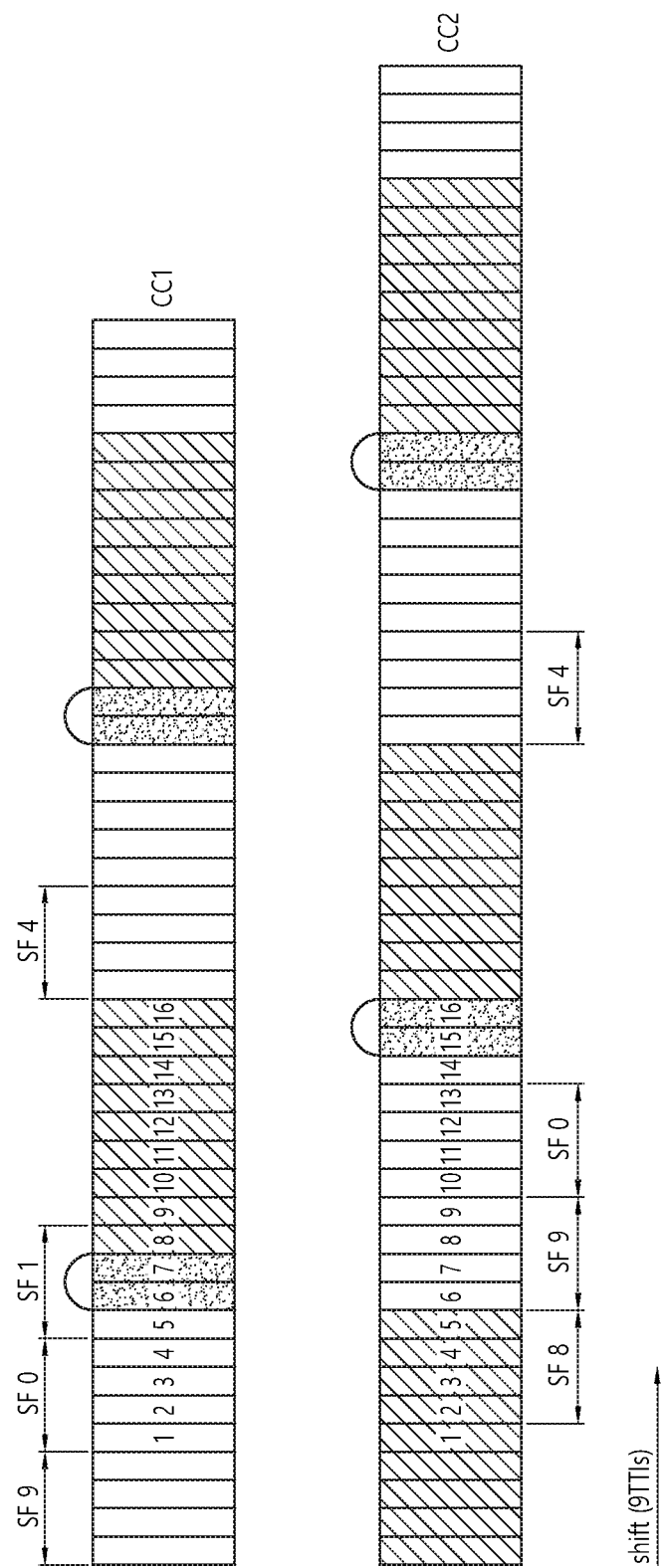
FIG. 11 shows an example of subframe/TTI index of multiple carriers for sTTI in TDD case.

FIG. 11 shows an example of subframe/TTI index of multiple carriers for sTTI in TDD case. FIG. 11 corresponds to a frame structure shown in FIG. 10, and subframe/TTI index are assigned. Referring to FIG. 11, the TTI index may be fixed based on the anchor carrier (e.g. CC1) for sTTI, whereas the subframe index may follow based on legacy subframe index per each carrier.

The TTI potentially used for a gap may not be scheduled with DL transmission. If there is some ACK-NACK timing is mapped to the gap, a UE may assume that ACK-NACK may be dropped/omitted in gap TTIs. In terms of scheduling of sTTI, sTTI index may be used in terms of scrambling, etc. If a UE is scheduled in a legacy TTI, subframe index of a legacy frame structure may be used. Legacy signals such as primary synchronization signal (PSS)/secondary synchronization signal (SSS) and CRS may be transmitted per legacy protocol, unless the sTTI is used in non-backward compatible carrier.

When the above approach, i.e. CA framework and/or virtual carrier where DL and UL resources are dynamically used between different carriers, is used, HARQ-ACK timing aspects, PUSCH timing aspects, sounding reference signal (SRS) transmission aspects, and/or physical random access channel (PRACH) transmission aspects need to be clarified.

Hereinafter, a method for supporting multiple carriers in TDD system via CA framework for ultra-reliable and low latency communications (URLLC) is described according to embodiments of the present invention.

In terms of HARQ-ACK transmission in multiple carrier, a virtual UL carrier may be configured. That is, each time interval/slot/subframe/sTTI may come from one UL carrier, i.e. virtual UL carrier, among the aggregated carriers. Regardless of how many UL carriers are configured, the virtual carrier may be used only for UL transmission, and the virtual UL carrier may be a PCell. When one or more UL SCell are deactivated, time interval/slot/subframe/sTTI from the deactivated carrier(s) may be considered as invalid or unavailable UL time interval/slot/subframe/sTTI. In the invalid or unavailable UL time interval/slot/subframe/sTTI, HARQ-ACK or PUSCH transmission may be dropped. Alternatively, different virtual UL carrier may be reconfigured whenever UL SCell is activated/deactivated. If only UL PCell is left, HARQ-ACK timing may go back to HARQ-ACK timing of the PCell.

Figure 12:
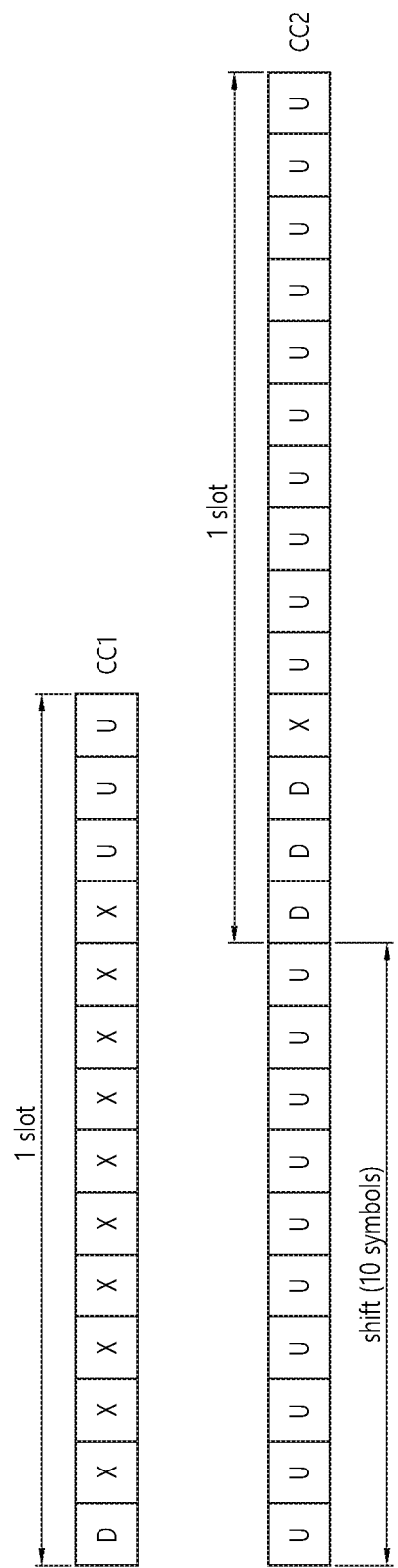
FIG. 12 shows an example of a virtual UL carrier according to an embodiment of the present invention.

FIG. 12 shows an example of a virtual UL carrier according to an embodiment of the present invention. This embodiment is based on NR system, in which symbols in a slot are classified as a DL symbol, a flexible symbol, and a UL symbol. A slot format defining which symbols are classified as a DL symbol, a flexible symbol and a UL symbol is identified by a slot format index. A part of the slot format index is shown above in Table 4.

Referring to FIG. 12, CC1 uses a first slot format in which symbols are classified as [D X X X X X X X X X X U U U]. CC2 uses a second slot format in which symbols are classified as [D D D X U U U U U U U U U U]. If slot boundary of CC1 and CC2 is aligned with each other without shift, the first symbol of the slot is always used for DL symbol, which cannot be used for UL transmission. In order to avoid such unavailable symbol, slot of CC2 can be shifted by 10 symbols, which corresponds to [U U U U U U U U U U D D D X]. Therefore, in perspective of UE, the virtual UL carrier may be configured as [CC2 CC2 CC2 CC2

CC2 CC2 CC2 CC2 CC2 CC2 CC1 CC1 CC1 CC1]. The UE can transmit UL data via the virtual UL carrier in each symbol.

Generally, a slot format, which is configured by slot format information (SFI) and applied cell-commonly, starts with "D" and ends with "U". That is, symbols unavailable for UL transmission may exist. By shifting one carrier in time domain as shown above, the virtual UL carrier may be configured, and the UE can transmit UL data via the virtual UL carrier reliably. In this case, numerologies between CCs should be aligned, and switching latency should also be considered.

In LTE/LTE-A, the following example may be considered for the virtual UL carrier. When CC1 utilizes UL-DL configuration 1 (i.e. [D S U U D D S U U D]) and CC2 utilizes UL-DL configuration 1, subframes 0/4/5/9 should be used for DL transmission. Accordingly, CC2 may be shifted by 4 subframes in time domain, so that the configuration in SFN=0 on PCell becomes [U D D S U U D D S U]. Therefore, the virtual UL carrier may be configured as [CC2 CC1 CC1 CC1 CC2 CC2 CC1 CC1 CC1 CC2]. In this case, the second subframe, i.e. subframe 1, may only have second sTTI (in 7 symbols) available for UL transmission or may not be available for PUCCH transmission.

According to UL-DL configuration, the virtual UL carrier may be configured as follows by Table 6.

TABLE 6

| UL-DL Config 1 + UL-DL Config 1 | U S U U U U S U U U |
| UL-DL Config 2 + UL-DL Config 1 | U S U S U U S U S U |
| UL-DL Config 0 + UL-DL Config 0 | U U U U U U U U U U |
| UL-DL Config 0 + UL-DL Config 1 | U U U U U U U U U U |
| ... | ... |

Different formats of the virtual UL carrier may be constructed depending on UL-DL configurations, and/or potentially number of carriers, and/or shift values.

For the combination where special subframes are present, the following approaches for HARQ-ACK timing and PUSCH can be considered.

(1) FDD HARQ-ACK timing may be used between any DL carrier and the virtual UL carrier. That is, n+k sTTI may transmit HARQ-ACK or PUSCH after short PDSCH (sPDSCH) or short DCI (sDCI) in sTTI n. HARQ-ACK or UL grant may be ignored/dropped at special subframe. Or, only HARQ-ACK may be ignored or only ignored in first sTTI.

(2) New timing table may be defined. DL sTTI mapped to the unavailable UL sTTI may be mapped to another sTTI by the new timing table. For example, one HARQ-ACK timing for [U S U U U S U U U] is as follows by Table 7.

TABLE 7

| U | S | U | U | U | U | S | U | U | U |
|---|---|---|---|---|---|---|---|---|---|
| n-k | | n-k, n-k-1 | n-k | n-k | n-k | | n-k, n-k-1 | n-k | n-k |

Referring to Table 7, HARQ-ACK on special subframe may be deferred to the next UL subframe.

In case of sTTI of 7 symbols where UpPTS length in special subframe is 6 or 7 symbols, Table 8 may be considered.

TABLE 8

| U | U | X | U | U | U | U | U | U | U | U | X | U | U | U | U | U | U | U |
|---|---|---|---|---|---|---|---|---|---|---|---|---|---|---|---|---|---|---|
| n-k | n-k | | n-k, n-k-1 | n-k | n-k | n-k | n-k | n-k | n-k | n-k | | n-k, n-k-1 | n-k | n-k | n-k | n-k | n-k | n-k |

Meanwhile, the new timing table describe above may further consider load balancing and/or latency as in LTE HARQ-ACK timing table. The similar table may also be used for short PUSCH (sPUSCH).

When a virtual UL carrier is configured, there may be more than one time interval/slot/subframe/sTTI among multiple UL carriers in each time interval/slot/subframe/sTTI, and only one UL carrier may be selected. In terms of carrier selection for configuring the virtual UL carrier, PCell may always have the highest priority. In other words, if there is UL time interval/slot/subframe/sTTI in PCell, PCell may be selected. Alternatively, it may be left up to the network. In other words, the carrier selection for configuring the virtual UL carrier may be done by higher layer configuration.

For UL resources not selected for the virtual UL carrier, at least one of the followings may be considered.

(1) A UE may not be expected to transmit in such UL resources. In other words, only UL resources selected for the virtual UL carrier may be used for PUSCH/PUCCH. However, SRS may be transmitted in all UL resources according to SRS configurations.

(2) A UE may be allowed to transmit PUSCH in such UL resources. However, uplink control information (UCI) piggybacking on PUSCH in such UL resources may not be allowed. Thus, this may be supported only when (s)PUCCH/(s)PUSCH simultaneous transmissions are supported by the UE. To differentiate the virtual UL carrier and UL carrier not selected for the virtual UL carrier, the cell ID for the virtual UL carrier may be same as PCell (or a separate cell ID with cell ID index may be given). The virtual UL carrier may be accessed as PCell UL. As all DL carriers are associated with the virtual UL carrier, UL grant for the virtual UL carrier may be scheduled with carrier indicator field (CIF). If this option is used, CIF may be necessary to schedule PUSCH in such UL resources.

In other words, the virtual UL carrier may be mapped to a virtual PCell UL, and the carrier aggregation may be performed as follows.

(1) Each DL carrier may schedule UL grant without CIF which will schedule (s)PUSCH in the virtual PCell UL.

(2) All (s)PUCCH may be transmitted on virtual PCell UL.

(3) In terms of activation/deactivation, legacy procedure may be followed. That is, a subset of virtual PCell UL resources may be deactivated if any SCell UL is deactivated.

(4) SRS may be transmitted following configuration of each cell.

(5) PRACH may be performed following configuration of each cell. That is, PRACH may be performed at each cell respectively.

(6) In other words, virtual PCell UL may only be used for (s)PUCCH and (s)PUSCH transmission, and may be activated only after RRC connection.

Meanwhile, only the virtual UL carrier has been described above for the sake of the convenience. However, the present invention described above may also be applied to the virtual DL carrier. That is, the virtual DL carrier can be configured based on the similar mechanisms for the virtual UL carrier described above.

Figure 13:
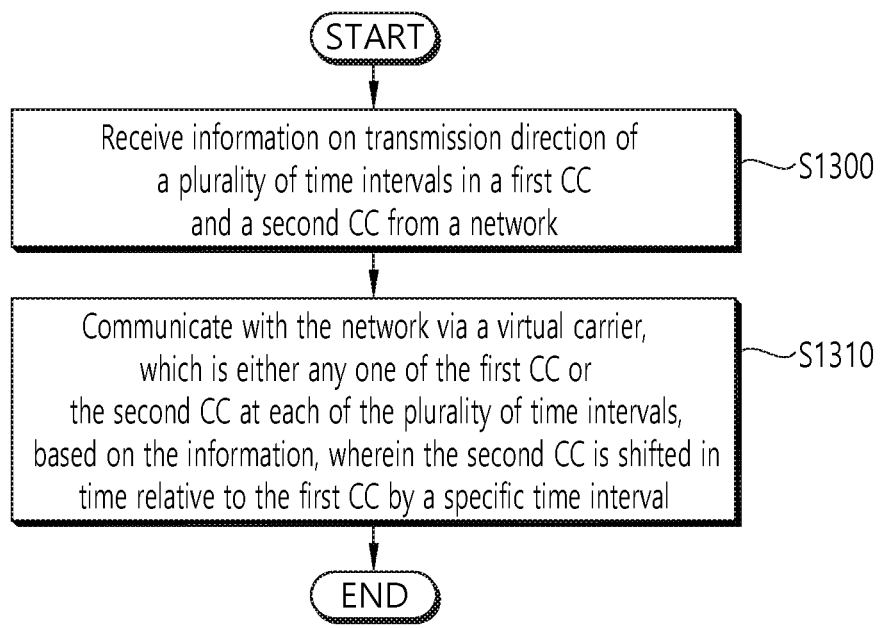
FIG. 13 shows a method for communicating with a network by a UE according to an embodiment of the present invention.

FIG. 13 shows a method for communicating with a network by a UE according to an embodiment of the present invention. The present invention described above for UE side may be applied to this embodiment.

In step S1300, the UE receives information on transmission direction of a plurality of time intervals in a first CC and a second CC from the network. In step S1310, the UE communicates with the network via a virtual carrier, which is either any one of the first CC or the second CC at each of the plurality of time intervals, based on the information. The second CC is shifted in time relative to the first CC by a specific time interval.

The virtual carrier may be a primary carrier among the first CC and the second CC. That is, the virtual carrier may be a carrier with highest priority. A communication with the network via a carrier which is not the virtual carrier may not be allowed. Or, a communication with the network via a carrier which is not the virtual carrier may be allowed. The communicating with the network via the virtual carrier comprises transmitting PUCCH to the network via the virtual carrier. That is, PUCCH may always be transmitted via the virtual carrier. The method may further include transmitting SRS to the network via any one of the first CC or the second CC based on configuration of each CC. The method may further include performing PRACH procedure towards the network via any one of the first CC or the second CC based on configuration of each CC.

The plurality of time intervals may be a plurality of symbols. That is, the virtual carrier may be configured in each symbol, and the second CC may be shifted in a unit of symbols relative to the first CC.

According to embodiment of the present invention shown in FIG. 13, by shifting one carrier in time domain, the virtual carrier may be configured, and the UE can communicate with the network via the virtual carrier reliably.

Figure 14:
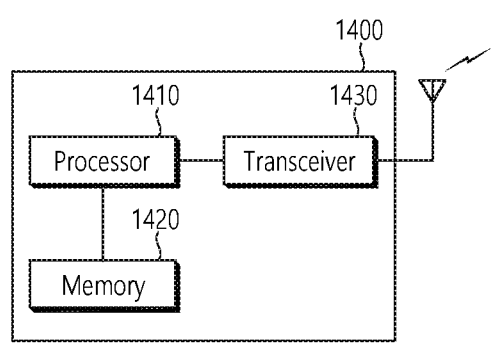
FIG. 14 shows a UE to implement an embodiment of the present invention.

FIG. 14 shows a UE to implement an embodiment of the present invention. The present invention described above for UE side may be applied to this embodiment.

A UE 1400 includes a processor 1410, a memory 1420 and a transceiver 1430. The processor 1410 may be configured to implement proposed functions, procedures and/or methods described in this description. Layers of the radio interface protocol may be implemented in the processor 1410. Specifically, the processor 1410 controls the transceiver 1430 to receive information on transmission direction of a plurality of time intervals in a first CC and a second CC from a network, and to communicate with the network via a virtual carrier, which is either any one of the first CC or the second CC at each of the plurality of time intervals, based on the information. The second CC is shifted in time relative to the first CC by a specific time interval.

The virtual carrier may be a primary carrier among the first CC and the second CC. That is, the virtual carrier may be a carrier with highest priority. A communication with the network via a carrier which is not the virtual carrier may not be allowed. Or, a communication with the network via a carrier which is not the virtual carrier may be allowed. The communicating with the network via the virtual carrier comprises transmitting PUCCH to the network via the virtual carrier. That is, PUCCH may always be transmitted via the virtual carrier. The method may further include transmitting SRS to the network via any one of the first CC or the second CC based on configuration of each CC. The method may further include performing PRACH procedure towards the network via any one of the first CC or the second CC based on configuration of each CC.

The plurality of time intervals may be a plurality of symbols. That is, the virtual carrier may be configured in each symbol, and the second CC may be shifted in a unit of symbols relative to the first CC.

The memory 1420 is operatively coupled with the processor 1410 and stores a variety of information to operate the processor 1410. The transceiver 1420 is operatively coupled with the processor 1410, and transmits and/or receives a radio signal.

According to embodiment of the present invention shown in FIG. 14, the processor 1410 can control the transceiver 1430 to communicate with the network via the virtual carrier reliably.

Figure 15:
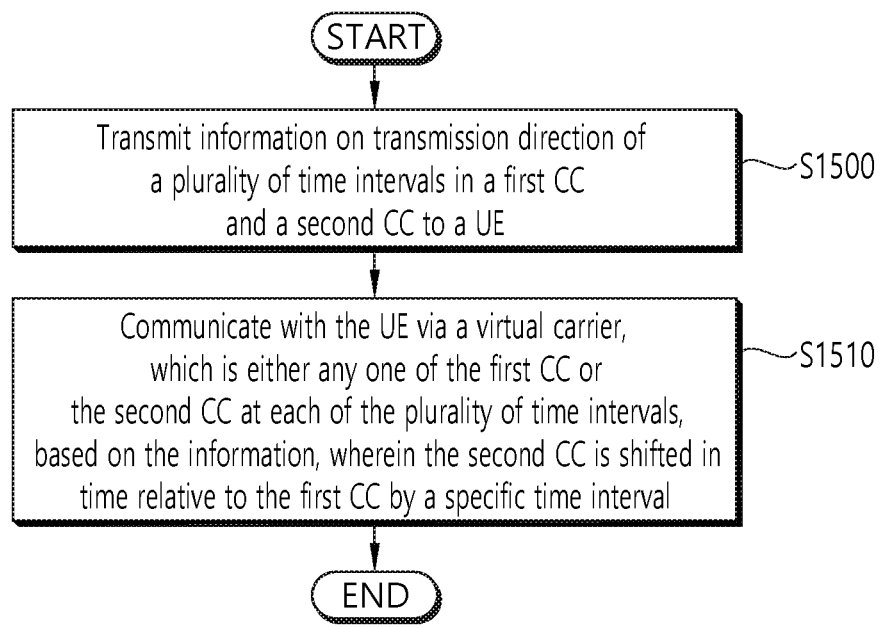
FIG. 15 shows a method communicating with a UE by a BS according to an embodiment of the present invention.

FIG. 15 shows a method communicating with a UE by a BS according to an embodiment of the present invention. The present invention described above for BS side may be applied to this embodiment.

In step S1500, the BS transmits information on transmission direction of a plurality of time intervals in a first CC and a second CC to the UE. In step S1510, the BS communicates with the UE via a virtual carrier, which is either any one of the first CC or the second CC at each of the plurality of time intervals, based on the information. The second CC is shifted in time relative to the first CC by a specific time interval.

The virtual carrier may be a primary carrier among the first CC and the second CC. That is, the virtual carrier may be a carrier with highest priority. A communication with the UE via a carrier which is not the virtual carrier may not be allowed. Or, a communication with the UE via a carrier which is not the virtual carrier may be allowed. The communicating with the UE via the virtual carrier comprises receiving PUCCH from the UE via the virtual carrier. That is, PUCCH may always be received via the virtual carrier. The method may further include receiving SRS from the UE via any one of the first CC or the second CC based on configuration of each CC. The method may further include performing PRACH procedure towards the UE via any one of the first CC or the second CC based on configuration of each CC.

The plurality of time intervals may be a plurality of symbols. That is, the virtual carrier may be configured in each symbol, and the second CC may be shifted in a unit of symbols relative to the first CC.

According to embodiment of the present invention shown in FIG. 15, by shifting one carrier in time domain, the virtual carrier may be configured, and the network can communicate with the UE via the virtual carrier reliably.

Figure 16:
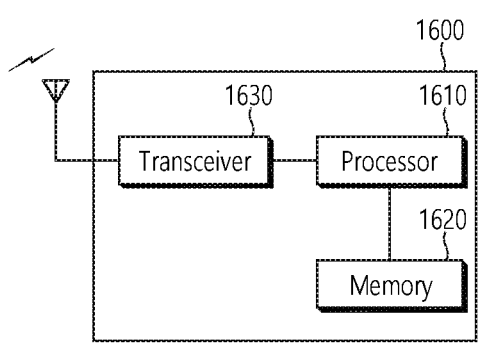
FIG. 16 shows a BS to implement an embodiment of the present invention.

FIG. 16 shows a BS to implement an embodiment of the present invention. The present invention described above for BS side may be applied to this embodiment.

A BS 1600 includes a processor 1610, a memory 1620 and a transceiver 1630. The processor 1610 may be configured to implement proposed functions, procedures and/or methods described in this description. Layers of the radio interface protocol may be implemented in the processor 1610. Specifically, the processor 1610 controls the transceiver 1630 to transmit information on transmission direction of a plurality of time intervals in a first CC and a second CC to the UE, and to communicate with the UE via a virtual carrier, which is either any one of the first CC or the second CC at each of the plurality of time intervals, based on the information. The second CC is shifted in time relative to the first CC by a specific time interval.

The virtual carrier may be a primary carrier among the first CC and the second CC. That is, the virtual carrier may be a carrier with highest priority. A communication with the UE via a carrier which is not the virtual carrier may not be allowed. Or, a communication with the UE via a carrier which is not the virtual carrier may be allowed. The communicating with the UE via the virtual carrier comprises receiving PUCCH from the UE via the virtual carrier. That is, PUCCH may always be received via the virtual carrier. The method may further include receiving SRS from the UE via any one of the first CC or the second CC based on configuration of each CC. The method may further include performing PRACH procedure towards the UE via any one of the first CC or the second CC based on configuration of each CC.

The plurality of time intervals may be a plurality of symbols. That is, the virtual carrier may be configured in each symbol, and the second CC may be shifted in a unit of symbols relative to the first CC.

The memory 1620 is operatively coupled with the processor 1610 and stores a variety of information to operate the processor 1610. The transceiver 1620 is operatively coupled with the processor 1610, and transmits and/or receives a radio signal.

According to embodiment of the present invention shown in FIG. 16, the processor 1610 can control the transceiver 1630 to communicate with the network via the virtual carrier reliably.

The processors 1410, 1610 may include application-specific integrated circuit (ASIC), other chipset, logic circuit and/or data processing device. The memories 1420, 1620 may include read-only memory (ROM), random access memory (RAM), flash memory, memory card, storage medium and/or other storage device. The transceivers 1430, 1630 may include baseband circuitry to process radio frequency signals. When the embodiments are implemented in software, the techniques described herein can be implemented with modules (e.g., procedures, functions, and so on) that perform the functions described herein. The modules can be stored in memories 1420, 1620 and executed by processors 1410, 1610. The memories 1420, 1620 can be implemented within the processors 1410, 1610 or external to the processors 1410, 1610 in which case those can be communicatively coupled to the processors 1410, 1610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) operating in a wireless communication system, the method comprising:

configuring a first component carrier (CC) and a second component carrier (CC), wherein the first CC and the second CC are time division duplex (TDD) carriers;

receiving a first TDD configuration for the first CC and a second TDD configuration for the second CC from a network, wherein the first TDD configuration informs a transmission direction of time intervals in the first CC, and the second TDD configuration informs a transmission direction of time intervals in the second CC;

configuring a virtual carrier in which each time interval is configured from either the first CC or the second CC based on (i) the first TDD configuration and (ii) the second TDD configuration which is shifted by a specific time interval relative to the first TDD configuration; and communicating with the network via the virtual carrier.

2. The method of claim 1, wherein the virtual carrier is a primary carrier among the first CC and the second CC.

3. The method of claim 1, wherein a communication with the network via a carrier which is not the virtual carrier is not allowed.

4. The method of claim 1, wherein a communication with the network via a carrier which is not the virtual carrier is allowed.

5. The method of claim 1, wherein the communicating with the network via the virtual carrier comprises transmitting a physical uplink control channel (PUCCH) to the network via the virtual carrier.

6. The method of claim 1, further comprising:
transmitting a sounding reference signal (SRS) to the network via any one of the first CC or the second CC.

7. The method of claim 1, further comprising:
performing a physical random access channel (PRACH) procedure towards the network via any one of the first CC or the second CC.

8. The method of claim 1, wherein the communicating with the UE via the virtual carrier comprises receiving a physical uplink control channel (PUCCH) from the UE via the virtual carrier.

9. The method of claim 1, further comprising:
receiving a sounding reference signal (SRS) from the UE via any one of the first CC or the second CC.

10. The method of claim 1, further comprising:
performing a physical random access channel (PRACH) procedure towards the UE via any one of the first CC or the second CC.

11. The method of claim 1, wherein the UE is in communication with at least one of a mobile device, a network, and/or autonomous vehicles other than the UE.

12. A user equipment (UE) configured to operate in a wireless communication system, the UE comprising:
a transceiver;
a processor; and
a memory operably connectable to the processor and storing instructions that, based on being executed by the processor, perform operations comprising:
receiving, using the transceiver, information regarding transmission direction of a plurality of time intervals in a first component carrier (CC) and a second CC from a network; and
communicating, using the transceiver, with the network via a virtual carrier, which is either any one of the first CC or the second CC at each of the plurality of time intervals, based on the information,
wherein the second CC is shifted in time relative to the first CC by a specific time interval.

13. A method performed by a base station (BS) operating in a wireless communication system, the method comprising:
- transmitting, to a user equipment (UE), a configuration for a first component carrier (CC) and a second component carrier (CC), wherein the first CC and the second CC are time division duplex (TDD) carriers;
- transmitting, to the UE, a first TDD configuration for the first CC and a second TDD configuration for the second CC to the UE, wherein the first TDD configuration informs a transmission direction of time intervals in the first CC, and the second TDD configuration informs a transmission direction of time intervals in the second CC; and
- communicating with the UE via a virtual carrier in which each time interval is configured from either the first CC or the second CC based on (i) the first TDD configuration and (ii) the second TDD configuration which is shifted by a specific time interval relative to the first TDD configuration.

14. The method of claim 13, wherein the virtual carrier is a primary carrier among the first CC and the second CC.

15. The method of claim 13, wherein a communication with the UE via a carrier which is not the virtual carrier is not allowed.

16. The method of claim 13, wherein a communication with the UE via a carrier which is not the virtual carrier is allowed.

17. A user equipment (UE) configured to operate in a wireless communication system, the UE comprising:
- a transceiver;
- a processor; and
- a memory operably connectable to the processor and storing instructions that, based on being executed by the processor, perform operations comprising:
  - configuring a first component carrier (CC) and a second component carrier (CC), wherein the first CC and the second CC are time division duplex (TDD) carriers;
  - receiving, using the transceiver, a first TDD configuration for the first CC and a second TDD configuration for the second CC from a network, wherein the first TDD configuration informs a transmission direction of time intervals in the first CC, and the second TDD configuration informs a transmission direction of time intervals in the second CC;
  - configuring a virtual carrier in which each time interval is configured from either the first CC or the second CC based on (i) the first TDD configuration and (ii) the second TDD configuration which is shifted by a specific time interval relative to the first TDD configuration; and
  - communicating, using the transceiver, with the network via the virtual carrier.

* * * * *